(12) United States Patent
Van Loen

(10) Patent No.: US 9,943,024 B2
(45) Date of Patent: Apr. 17, 2018

(54) WORK VEHICLE

(71) Applicant: VANMAC BEHEER B.V., Amersfoort (NL)

(72) Inventor: Leonardus Joannes Antonius Van Loen, Amersfoort (NL)

(73) Assignee: VANMAC BEHEER B.V., Amersfoort (NL)

( * ) Notice: Subject to any disclaimer, the term of this patent is extended or adjusted under 35 U.S.C. 154(b) by 0 days.

(21) Appl. No.: 14/904,242

(22) PCT Filed: Jul. 10, 2014

(86) PCT No.: PCT/NL2014/050471
§ 371 (c)(1),
(2) Date: Jan. 11, 2016

(87) PCT Pub. No.: WO2015/005788
PCT Pub. Date: Jan. 15, 2015

(65) Prior Publication Data
US 2016/0150718 A1 Jun. 2, 2016

(30) Foreign Application Priority Data
Jul. 11, 2013 (NL) .................................... 2011144

(51) Int. Cl.
*A01B 73/04* (2006.01)
*A01D 34/44* (2006.01)

(52) U.S. Cl.
CPC ............ *A01B 73/046* (2013.01); *A01D 34/44* (2013.01)

(58) Field of Classification Search
CPC ......... A01B 71/06; A01B 73/00; A01B 73/04; A01B 73/042; A01B 73/046; A01D 34/44
See application file for complete search history.

(56) References Cited

U.S. PATENT DOCUMENTS 3,106,811 A * 10/1963 Heth .................... A01D 75/306
                                                             56/7
4,204,575 A * 5/1980 Richardson .......... A01B 73/046
                                                            172/1

(Continued)

FOREIGN PATENT DOCUMENTS

EP         2380423 A2    10/2011
NL         2004859 C     12/2011

OTHER PUBLICATIONS

International Search Report, PCT/NL2014/050471, dated Oct. 15, 2014.

*Primary Examiner* — John Weiss
(74) *Attorney, Agent, or Firm* — Perry + Currier Inc.

(57) ABSTRACT

A work vehicle (1) comprises a mobile frame with a main shaft (2) and a set of support arms adjustable between a lateral operative position, in which the support arms extend laterally of the frame on either side of the main shaft, and an at least partially upward oriented transport position. The support arms have a plurality of mutually pivotable support arm parts which support work modules (11A . . . 11F) placed at a regular distance from each other in order to thereby perform work on a ground surface in the operative position. In the operative position a center of a first of the support arms is situated on a first side of the main shaft at a lateral distance from the main shaft, and in the operative position a center of a second of the support arms is situated on an opposite second side of the main shaft at a lateral distance from the main shaft.

6 Claims, 2 Drawing Sheets

(56) References Cited

U.S. PATENT DOCUMENTS

| | | | |
|---|---|---|---|
| 6,684,962 B1 * | 2/2004 | Lewallen | A01B 63/22 |
| | | | 111/57 |
| 7,497,269 B2 * | 3/2009 | Jagow | A01B 73/046 |
| | | | 172/311 |
| 2010/0314144 A1 | 12/2010 | Hennes | |
| 2011/0131762 A1 | 6/2011 | Palen | |
| 2015/0230399 A1 * | 8/2015 | Blunier | A01B 49/06 |
| | | | 111/121 |

* cited by examiner

WORK VEHICLE

The present invention relates to a work vehicle comprising a mobile frame with a main shaft and comprising a set of support arms adjustable between a lateral operative position, in which the support arms extend laterally of the frame on either side of the main shaft, and an at least partially upward oriented transport position, and wherein the support arms comprise a plurality of mutually pivotable support arm parts which support work modules placed at a regular distance from each other in order to thereby perform work on a ground surface in the operative position. For the present invention a work vehicle must be understood to mean, among other things, any driven, drawn or autonomous vehicle able and configured to perform work on a ground surface, such as for instance an agricultural vehicle.

A work vehicle of the type stated in the preamble is known from the Netherlands patent application NL 2004859 of applicant. The work vehicle described therein, a grass mower, comprises a mobile frame with a set of wheels provided on either side of a main shaft drawn by a tractive vehicle. The vehicle comprises a set of support arms provided with a number of work modules for working a ground surface therewith. The work modules on a support arm are placed here at regular distances from each other and the work modules of a first of the support arms is offset in the lateral direction relative to a second of the support arms so that an overall working area of the work modules is uninterrupted in a direction of forward movement of the work vehicle, and a ground surface can thus be worked uniformly.

In an operative position of the known work vehicle the support arms extend laterally from the frame in order to give the vehicle a relatively great working width. The support arms are adjustable from the relatively wide operative position to a transport position wherein mutually pivotable support arm parts of the support arms are oriented upward. In the transport position the vehicle thus complies with the usual legal maximum allowable width for driving the vehicle on the public highway.

In order to prevent the upward oriented support arms of the work vehicle exceeding a maximum allowable height for transport on the public highway, in the known work vehicle two mutually pivotable support arm parts of a support arm are rotatable along a pivot shaft. By a rotation about the pivot shaft the support arm parts can be moved in relatively simple manner from the operative position, in which the support arm parts extend at least substantially mutually in line, to the transport position in which the support arm parts are placed at least substantially coaxially opposite each other. A height of the vehicle hereby also remains within the set requirements for transport on the public highway.

Although the known work vehicle thus provides a very good wide operative position while being easily adjustable within the dimensions usually laid down by law for transport on the public highway, still further improvement can be made particularly for special types of work vehicle.

The present invention thus has for its object to provide a work vehicle with a transport position which remains within the legally required dimensions for transport on the public highway while an at least substantially maximum width with the greatest possible working area is maintained in an operative position.

In order to achieve the intended object a work vehicle of the type stated in the preamble has the feature according to the invention that in the operative position a centre of a first of the support arms is situated on a first side of the main shaft at a lateral distance from the main shaft and wherein in the operative position a centre of a second of the support arms is situated on an opposite second side of the main shaft at a lateral distance from the main shaft.

The present invention is based on the insight that an asymmetrical position of the work arms with work modules relative to the main shaft makes possible a maximum number of work modules within a certain maximum width of the device in the operative position. A symmetrical position, such as in known vehicles, results in most cases in a smaller number of work modules, since the provision of work modules which are placed at a regular distance from each other, and are moreover offset in the lateral direction from a first of the support arms relative to a second of the support arms, results in only one of the two support arms being able to support a central work module placed under the main shaft.

Because the centres of the support arms in the work vehicle according to the present invention are each situated on an opposite side of the main shaft in the operative position of the work vehicle, wherein a portion of a support arm on a one side of the main shaft differs from a portion of the support arm on an opposite side of the main shaft, a relatively large number of work modules placed at a regular distance from each other is possible within a maximum length of the support arm.

In a preferred embodiment the work vehicle according to the present invention is characterized in that the support arms are at least substantially identical and mirrored relative to the main shaft. In addition to an optimal use of the available maximum length of the support arms on either side of the main shaft, this also ensures that the two support arms can be driven by a similar drive.

In a further preferred embodiment the work vehicle according to the present invention is characterized in that the support arms comprise on a side of the main shaft at least a first support arm part, a second support arm part and a third support arm part, wherein in the transport position the first support arm part is oriented upward, the second support arm part extends above the main shaft and at least substantially parallel to a ground surface and the third support arm part is oriented at least substantially toward the ground surface at an outer end of the support arm.

In a further preferred embodiment the work vehicle according to the present invention is characterized in that the support arms comprise a fourth support arm part and fifth support arm part on an opposite side of the main shaft, wherein in the transport position the fourth support arm part is oriented obliquely upward in the direction of the main shaft and the fifth support arm part is oriented obliquely over the main shaft in the direction of the ground surface on an opposite outer end of the support arm.

A particular embodiment of the work vehicle according to the present invention has the feature that the first, second and third support arm parts define an at least substantially rectangular outer periphery of the work vehicle in the transport position, and that the fourth and fifth support arm parts are situated wholly within the outer periphery in the transport position.

In order to prevent the work arms of the work vehicle protruding unnecessarily far from the main shaft during transport, the work vehicle according to the present invention is characterized in a further particular embodiment in that adjusting means are provided which are able and configured to adjust the work arms, at least in the transport position, in a lateral direction relative to the main shaft.

The work vehicle according to the present invention is highly suitable in particular as a mowing machine, wherein the work module comprises a mowing implement such as a mower deck. The present invention is however by no means limited hereto, but can also be advantageously applied to other types of work vehicle and in particular to work vehicles wherein the work module comprises an implement selected from the group of: rake, (hay) tedder, cultivator, (disc) harrow and brush.

The invention will now be further elucidated on the basis of an exemplary embodiment and an accompanying drawing. In the drawing.

The figures are otherwise purely schematic and not drawn to scale. Some dimensions in particular may be exaggerated to greater or lesser extent for the sake of clarity. Corresponding parts are designated as far as possible in the figures with the same reference numeral.

Figure 1A:
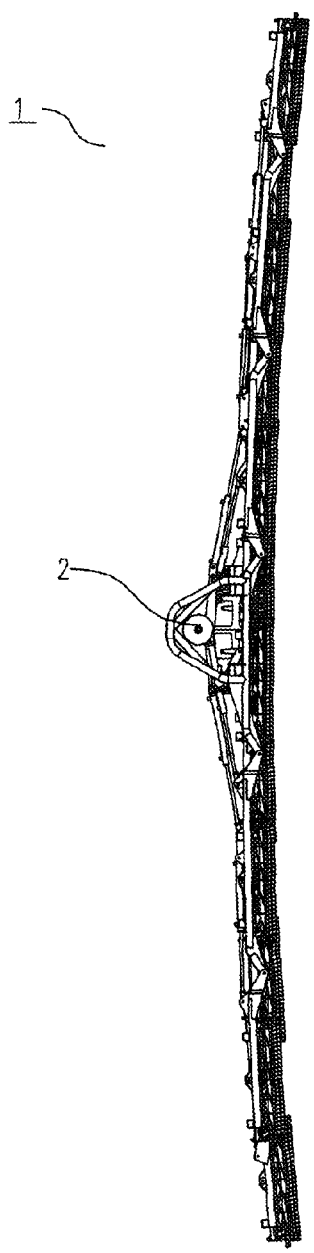
FIG. 1A shows a front view of an exemplary embodiment of a work vehicle according to the invention in an operative position.

As shown in FIG. 1A, work vehicle 1 comprises a main shaft 2 of a frame (not shown) for displacement thereby above a ground surface. The frame can here comprise for instance a set of wheels for travel over the ground surface therewith, either independently owing to the presence of a drive such as a motor, or moved as a trailer by a pulling or pushing vehicle such as tractor.

Figure 1B:
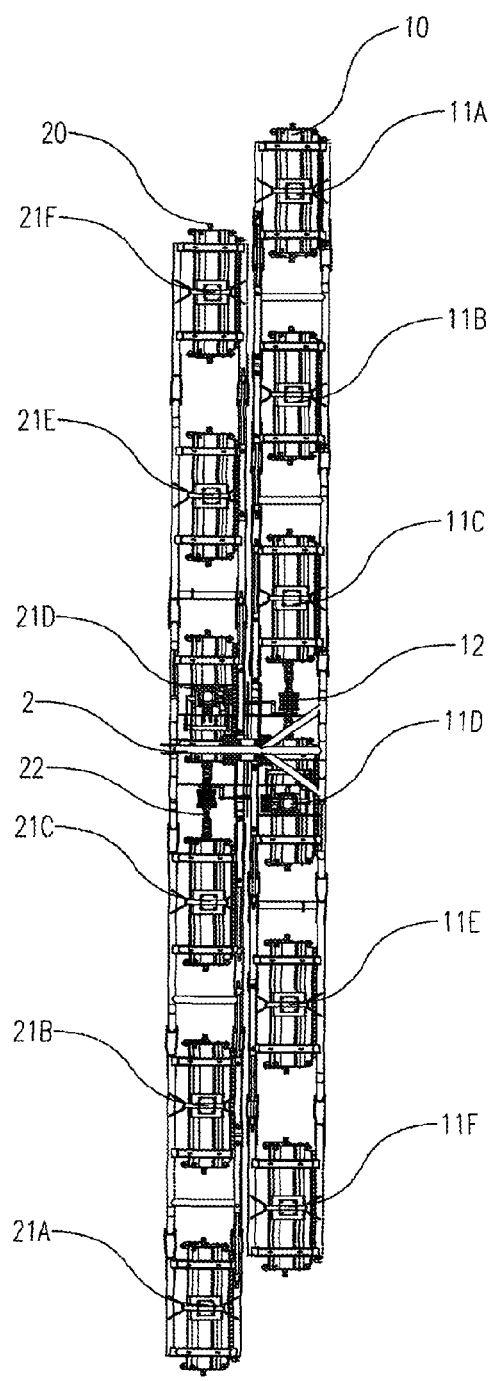
FIG. 1B shows a top view of the exemplary embodiment of a work vehicle according to the invention in an operative position.

Two support arms, a rear support arm 20 and a front support arm 10, extend laterally on either side of main shaft 2 (see FIG. 1B). The front support arm 10 comprises in this exemplary embodiment six work modules 11A . . . 11F placed at a regular distance from each other and mutually coupled via five hinge parts 13. The rear support arm 20 similarly comprises in this exemplary embodiment six work modules 21A . . . 21F placed at a regular distance from each other and mutually coupled via five hinge parts 23. The support arms are hereby adjustable between the operative position shown in FIGS. 1A, 1B and a transport position as shown in FIG. 2.

Figure 2:
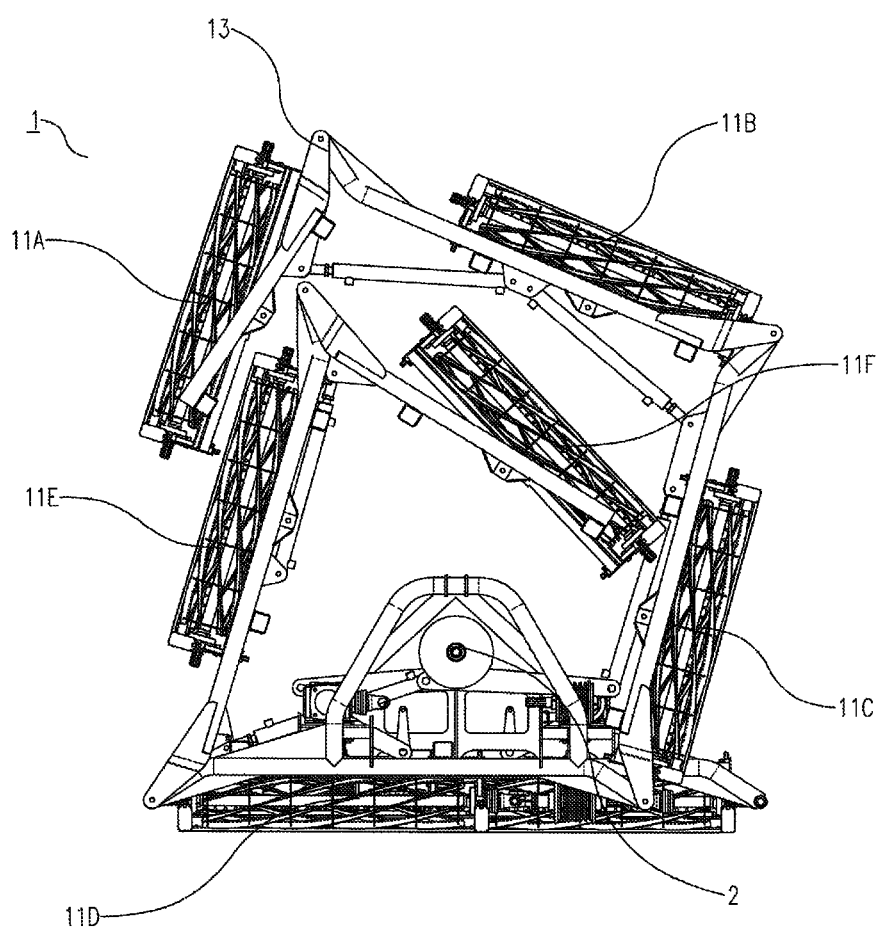
FIG. 2 shows a front view of the exemplary embodiment of a work vehicle according to the invention in a transport position.

As shown in FIG. 2 of the front support arm, a first support arm part provided with work module 11C, a second support arm part provided with work module 11B and a third support arm part provided with work module 11A extend here in the operative position laterally from a first side of main shaft 2, while a fourth support arm part provided with work module 11E and fifth support arm part provided with work module 11F extend laterally from an opposite second side of main shaft 2. A sixth support arm part provided with work module 11D lies partially under main shaft 2.

In the transport position the first support arm part 11C is oriented upward, the second support arm part 11B extends above main shaft 2 at least substantially parallel to a ground surface and the third support arm part 11A is oriented with a free outer end thereof at least substantially toward the ground surface. The fourth support arm part 11E on an opposite side of the main shaft is oriented obliquely upward in the direction of the main shaft in the transport position and the fifth support arm part 11F is oriented obliquely over the main shaft with an opposite free outer end of the support arm oriented in the direction of the ground surface. The sixth support arm part 11D is parallel to the ground surface and connects the first support arm part 11C and the fourth support arm part 11E.

The first, second, third and sixth support arm parts 11A, B, C, D thus define in the transport position an at least substantially rectangular outer periphery of the work vehicle within which the fourth and fifth support arm parts 11E, F are wholly situated. The support arm hereby takes on a suitable form in the transport position, wherein optimal use is made of the maximum allowable height and width of the work vehicle for transport on the public highway. The present invention thus provides an extremely efficient work vehicle 1 which can be easily adjusted from a relatively wide operative position to a compact and safe transport position.

The rear support arm 20 is identical to the front support arm 10 and thus has six work modules 21A . . . F placed at the same distance from each other and mutually coupled by five hinge parts. The front support arm 10 and rear support arm 20 are however mirrored relative to main shaft 2. Work modules 21A . . . F are hereby situated in lateral direction at the position of the pivot points between the work modules 11A . . . F of the front support arm 10. The work modules hereby lie in line in the lateral direction and form an uninterrupted row, whereby a ground surface can be worked in neatly uniform manner. This avoids parts of the ground surface at the position of the pivot points and the frame not being worked when work vehicle 1 passes over the ground surface. In this exemplary embodiment work vehicle 1 forms a grass mower and the work modules comprise a mower deck for the purpose of mowing a field therewith. Because the work modules lie in line in lateral direction, the field can be mowed over substantially a full width of the work vehicle in one operation.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. Work vehicle comprising a mobile frame with a main axis and comprising a set of support arms adjustable between a lateral operative position, in which the support arms extend laterally on either side of the main axis of the frame, and an at least partially upward oriented transport position, and wherein the support arms comprise a plurality of mutually pivotable support arm parts which support work modules placed at a regular distance from each other in order to thereby perform work on a ground surface in the operative position, wherein in the operative position, a centre of a first of the support arms is situated at a lateral distance from the main axis on a first side of the main axis and a centre of a second of the support arms is situated at a lateral distance from the main axis on a second side of the main axis, wherein each of the support arms comprise on a side of the main axis at least a first support arm part, a second support arm part and a third support arm part, wherein in the transport position the first support arm part is oriented upward, the second support arm part extends above the main axis and at least substantially parallel to a ground surface and the third support arm part is oriented at least substantially toward the ground surface at a first outer end of the support arm, wherein each of the support arms comprise a fourth support arm part and fifth support arm part on an opposite side of the main axis, wherein in the transport position the fourth support arm part is oriented obliquely upward in the direction of the main axis and the fifth support arm part is oriented obliquely over the main axis in the direction of the ground surface on an opposite outer end of the support arm, and wherein the first, second and third support arm parts define an at least substantially rectangular outer periphery of the work vehicle in the transport position, and that the fourth and fifth support arm parts are situated wholly within the outer periphery in the transport position.

2. Work vehicle as claimed in claim 1, wherein the support arms are at least substantially identical and mirrored relative to the main axis.

3. Work vehicle as claimed in claim 1, wherein adjusting means are provided which are able and configured to adjust the support arms, at least in the transport position, in a lateral direction relative to the main axis.

4. Work vehicle as claimed in claim 1, wherein the work modules comprise an implement selected from the group of: mower deck, rake, hay tedder, cultivator, disc harrow and brush.

5. Work vehicle as claimed in claim 1, wherein the work vehicle is a mowing machine.

6. Work vehicle as claimed in claim 5, wherein the mowing machine is a reel mower.

* * * * *